United States Patent
Yamami et al.

(10) Patent No.: US 10,676,119 B2
(45) Date of Patent: Jun. 9, 2020

(54) STEERING WHEEL

(71) Applicant: NIHON PLAST CO., LTD., Shizuoka (JP)

(72) Inventors: Akihiko Yamami, Guangdong (CN); Katsuya Muramatsu, Shizuoka (JP); Masahiro Ooka, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 16/233,153

(22) Filed: Dec. 27, 2018

(65) Prior Publication Data
US 2019/0193771 A1 Jun. 27, 2019

(30) Foreign Application Priority Data
Dec. 27, 2017 (JP) ................................. 2017-251845

(51) Int. Cl.
*B62D 1/06* (2006.01)

(52) U.S. Cl.
CPC ............... *B62D 1/06* (2013.01); *B62D 1/065* (2013.01)

(58) Field of Classification Search
CPC ............. B62D 1/04; B62D 1/06; B62D 1/065
See application file for complete search history.

(56) References Cited

U.S. PATENT DOCUMENTS

| | | | | |
|---|---|---|---|---|
| 9,067,619 B2* | 6/2015 | Cho | ................. | B62D 1/065 |
| 10,202,137 B2* | 2/2019 | Okazaki | ................. | B62D 1/06 |
| 2011/0167953 A1* | 7/2011 | Jan | ................. | B62D 1/06 74/552 |
| 2013/0276573 A1* | 10/2013 | Henning | ................. | B62D 1/06 74/558 |
| 2015/0367875 A1* | 12/2015 | Nonoyama | ................. | B62D 1/065 219/204 |
| 2019/0291770 A1* | 9/2019 | Uematsu | ................. | B62D 1/06 |

FOREIGN PATENT DOCUMENTS

JP 2015-189294 A 11/2015

* cited by examiner

*Primary Examiner* — Adam D Rogers
(74) *Attorney, Agent, or Firm* — Brundidge & Stanger, P.C.

(57) ABSTRACT

There is provided a steering wheel to make it possible to install a covering member on a rim section main body portion in a wide range and with a good external appearance. A steering wheel base section includes the rim section main body portion that configures a rim section. The rim section main body portion is provided with a groove along the rim section main body portion. The groove is provided with a first line-shaped groove and a second line-shaped groove that is less bent than the first groove. The covering member is wrapped around the rim section main body portion of the steering wheel base section. The covering member is provided with divergence covering sections disposed along the first groove with the first groove interposed therebetween. The covering member straddles the second groove at a position of the second groove and connects the divergence covering sections by a covering base portion.

5 Claims, 4 Drawing Sheets

STEERING WHEEL

CROSS REFERENCE TO RELATED APPLICATIONS

This application is entitled to and claims the benefit of Japanese Patent Application No. 2017-251845 filed on Dec. 27, 2017, the disclosure of which including the specification, drawings and abstract is incorporated herein by reference in its entirety.

TECHNICAL FIELD

The present invention relates to a steering wheel having a grip section that is gripped and operated by a driver.

BACKGROUND ART

In recent years, an electric vehicle (EV) is widely used. The electric vehicle is configured of a combination of a rechargeable battery and a motor, and it is necessary to suppress consumption of accumulated power because energy needs to be replenished from an external charger, basically. In this respect, in order to suppress power consumption for heating (air conditioner) performed by high power consumption, a section is provided to cause warmth to be directly transmitted by a steering wheel that is directly touched by an occupant (driver). For example, a heater line as a heating element is buried in the steering wheel, and thereby it is possible to warm the steering wheel even when it is not long after a start, and various engines are not sufficiently warmed. Hence, when an automobile as a vehicle parked outside in winter is started and driven, for example, it is possible to suppress use of heating and suppress power consumption while there is a reduction in difficulty or discomfort of an operation due to a cold steering wheel.

As such a configuration, a steering wheel is known in which a heater unit provided with layout of a heater line on a strip-shaped sheet element is wrapped around an outer circumference of a rim section of a cored bar or the like formed of a steering wheel base material and is further covered with an outer skin element such as genuine leather (for example, see PTL 1).

CITATION LIST

Patent Literature

PTL 1

Japanese Patent Application Laid-Open No. 2015-189294 (pp. 5 to 8 and FIGS. 1 to 5)

SUMMARY OF INVENTION

Technical Problem

In recent years, in order to improve a design, an external design of the steering wheel is set, in some cases. For example, there is provided a steering wheel subjected to a so-called grain-patterned external treatment such as forming a recessed groove in a rim section of the cored bar on an occupant-facing side thereof and burying a terminal portion of an outer skin element in the recessed groove. In a case of the design, split surfaces of the outer skin element that is long along the rim section in a longitudinal direction is set. There is demand for a steering wheel having such a non-monotonic design, in which it is also possible to install a functional structure such as a heater extensively and with a good external appearance.

The present invention is made in this respect, and an object thereof is to provide a steering wheel in which it is possible to install a covering member on a grip section main body portion in a wide range and with a good external appearance.

Solution to Problem

According to a first aspect, a steering wheel has a grip section that is gripped and operated by a driver, the steering wheel including: a steering wheel base section provided with a grip section main body portion, of which at least a part is formed to be bent and which configures the grip section, and a groove formed along the grip section main body portion; and a covering member that is wrapped around the grip section main body portion of the steering wheel base section, in which the groove is provided with a first groove that is formed in a line shape, and a second groove that is formed in a line shape and is less bent than the first groove, and in which the covering member is provided with a plurality of divergence covering sections that are disposed along the first groove and are positioned with the first groove interposed therebetween, and a covering base portion that straddles the second groove at a position of the second groove and connects the plurality of divergence covering sections to each other.

According to a second aspect, in the steering wheel according to the first aspect, the covering member is a heater unit provided with a sheet-shaped covering member main body and a heating circuit as a functional part that is held by the covering member main body and generates heat when energized.

According to a third aspect, in the steering wheel according to the second aspect, the heating circuit as the functional part functions as a sensor circuit that detects a contact.

According to a fourth aspect, in the steering wheel according to the first or second aspect, the covering member is a sensor unit provided with a sheet-shaped covering member main body and a sensor circuit as a functional part that is held by the covering member main body and detects a contact.

In a fifth aspect, in the steering wheel according to the first aspect, the covering member is a sheet-shaped outer skin section.

Advantageous Effects of Invention

In the steering wheel according to the first aspect, the groove formed along the grip section main body portion of the steering wheel base section is provided with the first line-shaped groove and the second line-shaped groove that is less bent than the first groove. The plurality of divergence covering sections of the covering member are disposed with the first groove interposed therebetween, and the covering base portion that connects the divergence covering sections is disposed to straddle the second groove. In this manner, it is possible to position the divergence covering sections on the entire grip section main body portion, it is possible to install the covering member on the grip section main body portion in a wide range, and it is possible to suppress a difference in dimension on both sides of the bent groove of the grip section main body portion at a position of the covering base portion that straddles the groove such that a defect such as a wrinkle on an external appearance is unlikely to be generated and it is possible to perform installation with a good external appearance.

In the steering wheel according to second aspect, in addition to effects of the steering wheel according to the first aspect, it is possible to dispose the covering member on the grip section main body portion in a wide range and warm the grip section in a wide range, and it is possible to obtain warmth even in a case where a driver grips any position of the grip section.

In the steering wheel according to the third aspect, in addition to effects of the steering wheel according to the second aspect, the heating circuit as the functional part functions as the sensor circuit that detects the contact, and thus it is possible to simply configure the steering wheel that is capable of detecting a contact while warming the grip section in a wide range.

In the steering wheel according to fourth aspect, in addition to effects of the steering wheel according to the first or second aspect, it is possible to dispose the covering member on the grip section main body portion in a wide range and detect the contact in a wide range of the grip section, and it is possible to detect a grip on the grip section even in a case where a driver grips any position of the grip section.

In the steering wheel according to fifth aspect, in addition to effects of the steering wheel according to the first aspect, it is possible to dispose a sheet-shaped outer skin section as the covering member on the grip section main body portion in a wide range and with a good external appearance.

DESCRIPTION OF EMBODIMENTS

Hereinafter, a configuration of an embodiment according to the present invention will be described with reference to the drawings.

Figure 3A:
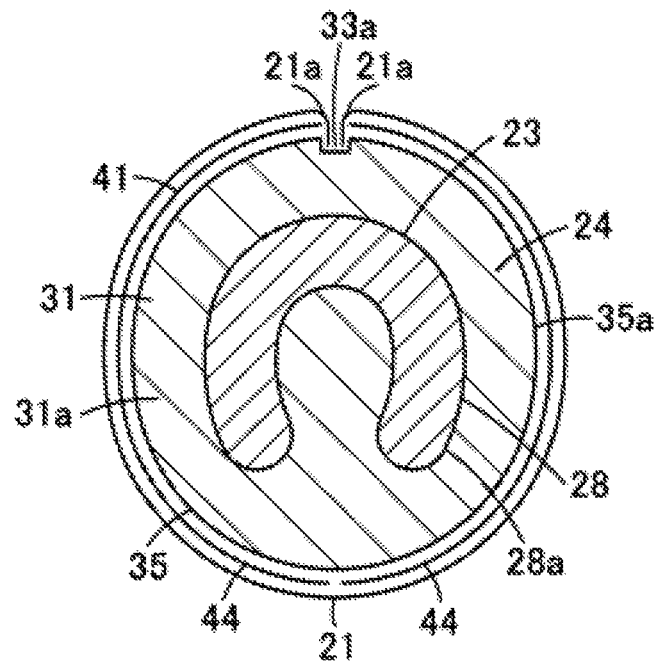
FIG. 3A is a schematic sectional view of a position corresponding to I-I in FIG. 1 of the steering wheel.
Figure 3B:
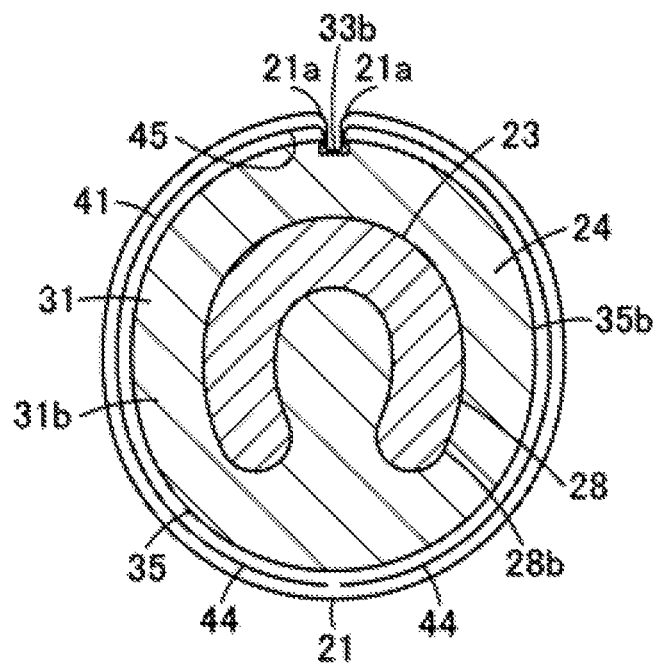
FIG. 3B is a schematic sectional view of a position corresponding to II-II in FIG. 1 of the steering wheel.
Figure 4:
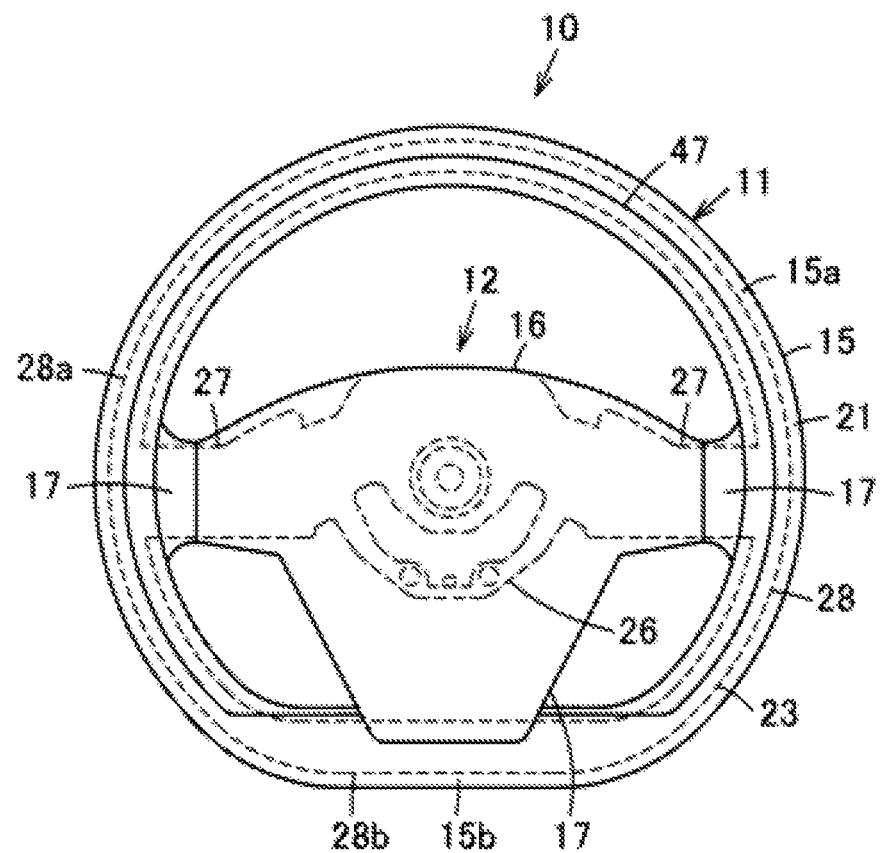
FIG. 4 is a front view of the steering wheel.

In FIGS. 3A, 3B, and 4, reference sign 10 represents a steering wheel of an automobile as a vehicle, for example. Steering wheel 10 includes steering wheel main body 11, pad body 12 which is mounted on an occupant side of steering wheel main body 11, or the like. Steering wheel 10 is mounted on a steering shaft provided in a vehicle in a state of being inclined normally; however, hereinafter, when steering wheel 10 is viewed from a side of a driver (occupant), an arrow U direction is described as an upper side, an arrow D direction is described as a lower side, a front side, that is, a side of a front glass on an upper front side, of the vehicle is described as the front side or a back surface side, and a rear side, that is, a lower rear side, of the vehicle is described as the rear side, a near side, or a front surface side.

Figure 1:
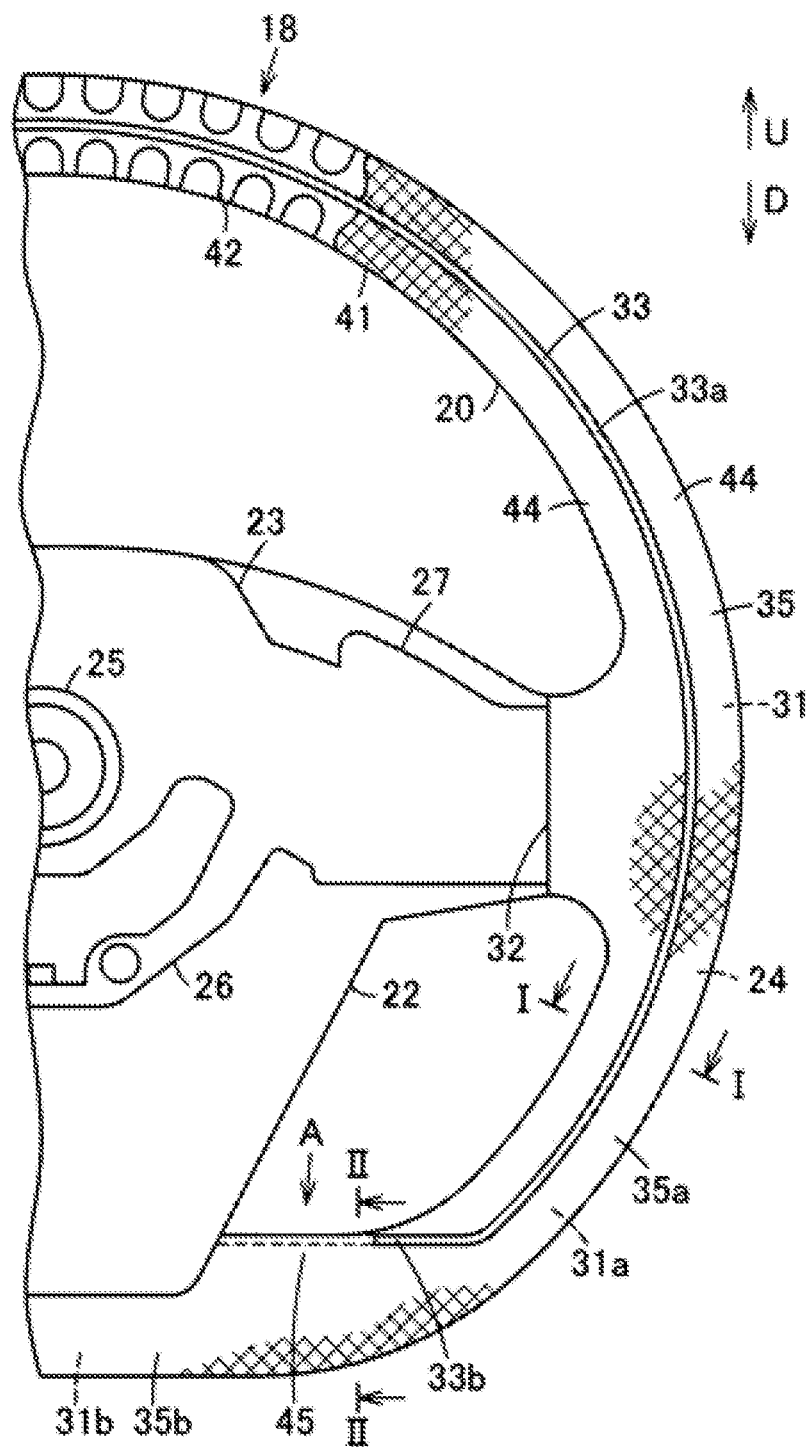
FIG. 1 is a front view showing a part of a steering wheel of an embodiment of the present invention.

In this manner, steering wheel main body 11 is configured to include a rim section (grip section) 15 as a grip section, boss section 16 that is positioned on an inner side of rim section 15, and a plurality of spoke sections 17 that connects rim section 15 and boss section 16; here, in the embodiment, three spoke sections 17 are provided. In addition, steering wheel main body 11 has steering wheel base section 18. In addition, steering wheel main body 11 has covering member 20. Further, steering wheel main body 11 has outer skin section 21. In this manner, steering wheel main body 11 has cover body 22 (FIG. 1).

Rim section 15 is a part that is gripped and operated by a driver (occupant). Rim section 15 can be formed in any shape; however, at least a part thereof has an annular shape formed along a circumference, for example. To be more specific, rim section 15 is provided with arc-shaped bending portion 15a and connection portion 15b extending in a right-left direction which are integrally provided. That is, when viewed from a front surface, in rim section 15, a part from the seven o'clock direction through the twelve o'clock direction to the five o'clock direction on an analog clock becomes bending portion 15a, and a part on a lower side from the five o'clock direction through the six o'clock direction to the seven o'clock direction on the analog clock becomes connection portion 15b that connects both ends of bending portion 15a. Hereinafter, sections of steering wheel main body 11 are disposed on the right, left, top and bottom sides with a (neutral) position of steering wheel 10 as a reference.

Bending portion 15a is formed in a half or more of rim section 15, that is, a main part of rim section 15. In the embodiment, bending portion 15a configures a part close to an upper side of a lower half of rim section 15, in addition to an upper half of rim section 15. Therefore, bending portion 15a is connected to right and left spoke sections 17 and 17. For example, bending portion 15a has a constant (also including substantially constant) curvature.

In the embodiment, connection portion 15b configures a part close to a lower side of the lower half of rim section 15, for example. Therefore, connection portion 15b is connected to a lower spoke section 17. In addition, connection portion 15b is formed of a straight portion extending in the right-left direction. That is, connection portion 15b is formed to have smaller bending, that is, a smaller bend (an absolute value of a curvature of each portion) than bending portion 15a.

Steering wheel base section 18 has cored bar 23 and resin layer 24 that is covered with covering member 20 that covers a part of cored bar 23.

Cored bar 23 shown in FIGS. 1, 3A, 3B, and 4 is made of metal and includes substantially cylindrical boss 25 having a serration structure of intermeshing with the steering shaft on the back surface side which is a vehicle body side of boss section 16, and boss plate 26 that configures the cored bar is integrally fixed to boss 25. In this manner, spoke cored bar section 27 corresponding to spoke section 17 is formed to be integrally connected from boss plate 26. Further, rim cored bar section 28 as a grip section cored bar corresponding to rim section 15 is fixed to spoke cored bar section 27 of spoke section 17.

Spoke cored bar section 27 is radially provided. Spoke cored bar section 27 may not need to correspond to all of spoke sections 17, or a part of spoke section 17 may be configured to have a finisher or cover body 22 without having spoke cored bar section 27. In the embodiment, spoke cored bar section 27 projects from boss plate 26 on right and left sides and is connected to rim cored bar section 28. That is, spoke cored bar section 27 is provided to correspond to right and left spoke sections 17 and is not provided for lower spoke section 17.

Rim cored bar section 28 configures a part of rim section 15. Rim cored bar section 28 is formed in a shape corresponding to a shape of rim section 15. That is, rim cored bar section 28 can be formed in any shape depending on the shape of rim section 15; however, at least a part of the rim cored bar section has an annular shape formed along a circumference, for example. In the embodiment, rim cored bar section 28 has bending cored bar portion 28*a* corresponding to bending portion 15*a* of rim section 15 and connection cored bar portion 28*b* corresponding to connection portion 15*b* of rim section 15, the bending cored bar portion and connection cored bar portion being integrally provided. That is, bending cored bar portion 28*a* is formed in a half or more of rim cored bar section 28, that is, a main part of rim cored bar section 28, and is formed in an arc shape having a constant (also including a substantially constant) curvature. In addition, bending cored bar portion 28*a* is directly connected to boss plate 26 via right and left spoke cored bar section 27. On the other hand, connection cored bar portion 28*b* is formed to extend in a straight line shape in the right-left direction, for example, and is formed to have smaller bending, that is, a smaller bend (an absolute value of a curvature of each portion) than bending cored bar portion 28*a*. In addition, in the embodiment, connection cored bar portion 28*b* is positioned to be separated from the boss plate 26.

Resin layer 24 is formed to cover at least rim cored bar section 28. In the embodiment, resin layer 24 is formed to cover entire rim cored bar section 28 and a part of spoke cored bar section 27, for example. To be more specific, resin layer 24 is provided with rim covering section 31, which covers rim cored bar section 28 at the position of rim section 15, and spoke covering section 32 that covers a region having a predetermined distance from an end portion that is connected to rim cored bar section 28 of spoke cored bar section 27 at the position of spoke section 17, the rim covering section and the spoke covering section being integrally provided. In addition, resin layer 24 is formed to have a substantially circular cross section, for example. In this manner, in the embodiment, resin layer 24 is made of a resin obtained by performing fine foaming on soft foaming polyurethane resin. In addition, resin layer 24 is provided with groove 33 that is an outer skin splitting portion for fixing a part of outer skin section 21 and is formed along rim cored bar section 28 at a position of rim cored bar section 28. In this manner, resin layer 24 is formed by using a forming mold (die) not shown. The mold includes one half mold and the other mold, schematically, and a cavity that is formed between the one half mold and the other half mold is filled with a synthetic resin raw material.

Rim covering section 31 configures rim cored bar section 28 and rim section main body portion 35 as a grip section main body portion that configures rim section 15. That is, resin layer 24 configures cored bar 23 and rim section main body portion 35. Rim covering section 31 has bending cored bar portion 28*a* of rim cored bar section 28, that is, bending covering portion 31*a* corresponding to bending portion 15*a* of rim section 15, and connection cored bar portion 28*b* of rim cored bar section 28, that is, connection covering portion 31*b* corresponding to connection portion 15*b* of rim section 15.

At least a part of rim section main body portion 35 is formed along an arc. That is, rim section main body portion 35 is formed to have a bend (be bent). In the embodiment, rim section main body portion 35 has bending main body portion 35*a*, which is a first rim section main body portion that is formed to include bending cored bar portion 28*a* of rim cored bar section 28 of cored bar 23 and bending covering portion 31*a* of rim covering section 31 of resin layer 24, and connection main body portion 35*b*, which is a second rim section main body portion that is formed to include connection cored bar portion 28*b* of rim cored bar section 28 of cored bar 23 and connection covering portion 31*b* of rim covering section 31 of resin layer 24, the bending main body portion 35*a* and connection main body portion 35*b* being integrally provided.

Bending main body portion 35*a* is formed in a half or more of rim main body section 35, that is, a main part of rim section main body portion 35, and is formed in an arc shape having a constant (also including a substantially constant) curvature. Bending main body portion 35*a* is directly connected to boss plate 26 via spoke cored bar section 27. That is, bending main body portion 35*a* is directly connected to right and left spoke sections 17 and 17.

Connection main body portion 35*b* is formed to extend in a straight line shape in the right-left direction, for example, and is formed to have smaller bending, that is, a smaller bend (an absolute value of a curvature of each portion) than bending main body portion 35*a*. In addition, in the embodiment, connection main body portion 35*b* is positioned to be separated from the boss plate 26 and is directly connected to lower spoke section 17.

Spoke covering section 32 is connected to rim covering section 31 and projects from rim covering section 31 on a side of spoke cored bar section 27. In the embodiment, spoke covering section 32 is formed at a position corresponding to right and left spoke sections 17 (spoke cored bar section 27), for example.

Groove 33 is formed in a line shape along rim section main body portion 35. At least a part of groove 33 is positioned on the rear side (front surface side) which as an occupant side on a front surface of resin layer 24 (rim section main body portion 35). Groove 33 is provided with first groove 33*a* formed in a line shape and second groove 33*b* formed in a line shape. For example, groove 33 may be formed at the same time as when resin layer 24 is formed by the forming mold or may be formed by performing processing after resin layer 24 is molded.

First groove 33*a* is a part that is formed in a line shape in bending main body portion 35*a* in rim section main body portion 35. First groove 33*a* is formed in a longitudinal shape along bending main body portion 35*a* at a position of bending main body portion 35*a* on the occupant side, for example. In the embodiment, first groove 33*a* has a bending shape formed in the arc shape and is formed along a center position of bending main body portion 35*a* when viewed from the front surface, in rim section main body portion 35. Hence, first groove 33*a* is formed to be connected from seven o'clock direction through twelve o'clock direction to five o'clock direction of the analog clock in rim section main body portion 35 when viewed from the front surface. In the embodiment, first groove 33*a* is formed to have a constant (also including a substantially constant) curvature larger than that of bending main body portion 35*a*; however, the curvature may not be constant at portions thereof or may partially change into a positive or negative curvature. In addition, first groove 33*a* may be partially formed in a straight line (a curvature of 0). That is, first groove 33*a* may have a part in which a degree of bending changes or a part in which a bending direction changes. In addition, first groove 33*a* may be formed to be longer than second groove 33*b*.

Second groove 33*b* is a part that is formed in a line shape in connection main body portion 35*b* in rim section main body portion 35. Second groove 33*b* is a gentle-curved portion that is less bent than first groove 33*a*. Here, second groove 33*b* is less bent than first groove 33*a*. This means that an average of absolute values of curvatures in second groove 33b is smaller than an average of absolute values of curvatures in any zone of first groove 33a, which has the same length as that of second groove 33b. That is, although first groove 33a may locally have a part that has an absolute value of the curvature smaller than that of second groove 33b, the part is shorter than second groove 33b, and an absolute value of a curvature in the vicinity of the part is larger than the absolute value of curvatures (average of absolute values of curvatures) of second groove 33b. It is preferable that an absolute value of a curvatures of each portion of second groove 33b is set to be equal to or smaller than an absolute value of a curvature of each portion of first groove 33a. For example, in the embodiment, second groove 33b is formed in a straight line shape (including a substantially straight line shape). That is, second groove 33b is formed to have a curvature of 0 (also including about 0). In addition, second groove 33b is formed on an upper edge portion of connection main body portion 35b in a right-left direction that is a longitudinal direction of connection main body portion 35b. In addition, second groove 33b may be formed to be continuous to both end portions of first groove 33a. That is, second groove 33b is formed in rim section main body portion 35 from each lower end portion of first groove 33a toward a center side of steering wheel 10, and a distal end portion of the second groove extends to a side portion of lower spoke section 17.

Covering member 20 is in a sheet shape and is disposed from a position to cover rim cored bar section 28 of resin layer 24, that is, rim covering section 31, to a position to cover a part of spoke cored bar section 27, that is, spoke covering section 32. Covering member 20 includes sheet member (mat portion) 41 as a covering member main body and function part 42 held by sheet member 41. Further, covering member 20 covers a front surface of resin layer 24 (rim section main body portion 35) and is bonded to the front surface of resin layer 24 (rim section main body portion 35). In addition, covering member 20 is provided with a plurality of divergence covering portions 44 and covering base portion 45 that connects divergence covering portions 44 to each other, the divergence covering portion and the covering base portion being integrally provided.

In the embodiment, covering member 20 is a heater unit for adjusting a temperature of rim section 15, for example. That is, as functional part 42 of covering member 20 of the embodiment, a heating circuit that is formed of a heater line (heating wire) having a line shape or a mesh shape, which generates heat when energized, a temperature sensor, or the like. For example, as sheet member 41, a porous material such as a non-woven fabric or a mesh may be used. In addition, functional part 42 can be disposed at any position; however, in the embodiment, the functional part is disposed to meander in a wavy shape. That is, functional part 42 is disposed to occupy a region having a predetermined plane shape with respect to sheet member 41. In this manner, functional part 42 is connected to a control circuit (not shown), and covering member 20 is configured to detect a temperature of rim section 15 when being energized by the control circuit and to generate heat depending on the temperature.

For example, a pair of divergence covering portions 44 are provided, are positioned with first groove 33a of groove 33 interposed therebetween, and covers a front surface of rim section main body portion 35 (rim covering section 31). That is, one of divergence covering portions 44 is an inner covering portion that cover a front surface of rim section main body portion 35 (steering wheel 10 rim covering section 31) on an inner side (side of boss section 16 which a side of a rotation center of steering wheel 10) with respect to groove 33, and the other divergence covering portion is an outer covering portion that covers a front surface of rim section main body portion 35 (rim covering section 31) on an outer side (side opposite to the side of boss section 16) with respect to groove 33. Hence, divergence covering portions 44 and 44 are positioned to be separated from each other at a position excluding covering base portion 45 on a front surface side and a back surface side of rim section main body portion 35 (rim covering section 31) (FIGS. 3A and 3B). In addition, divergence covering portion 44 is formed to have schematically a quadrangular shape; however, in order to bend the divergence covering portion, depending on a bend of rim section main body portion 35 (rim covering section 31) in a latitude line (large diameter) direction of rim section 15, which is a rotation direction of steering wheel 10, divergence covering portion 44 may be appropriately provided with a bending allowable portions such as a cutout or a notch. In addition, divergence covering portion 44 that is positioned on an inner side of first groove 33a of groove 33 may be disposed to cover at least a part of spoke covering section 32. Further, divergence covering portions 44 are disposed along first groove 33a of groove 33. Here, divergence covering portions 44 is provided along first groove 33a of groove 33. This does not mean that the embodiment is limited to a configuration in which divergence covering portions 44 are disposed to have substantially the same curvature as that of first groove 33a. In this manner, functional parts 42 are disposed over each of the substantially entire divergence covering portions 44. That is, functional parts 42 are disposed on divergence covering portion 44 that is positioned on the inner side with respect to groove 33 and divergence covering portion 44 that is positioned on the outer side with respect to the groove. Therefore, functional parts 42 of covering member 20 are positioned on the divergence covering portions on the inner side and the outer side, with groove 33 interposed therebetween, in rim section main body portion 35 (rim section 15).

Figure 2:
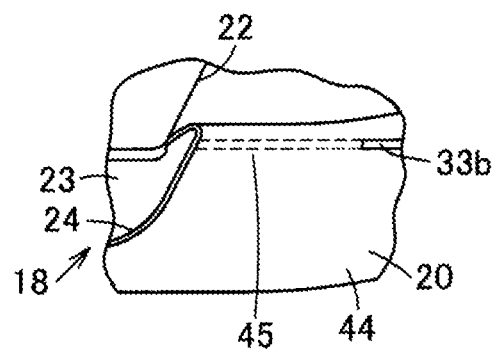
FIG. 2 is a view from an A arrow in FIG. 1 of the steering wheel.

Covering base portion 45 connects divergence covering portions 44 to each other. In the embodiment, covering base portion 45 is positioned at end portions of divergence covering portions 44 and 44 and is positioned at lower end portions of divergence covering portions 44 and 44 in a state in which the covering base portion is positioned in rim section main body portion 35 (rim covering section 31). In addition, covering base portion 45 is disposed to straddle second groove 33b of groove 33 (FIG. 2). That is, covering base portion 45 is formed to be continuous from the inner side to the outer side of second groove 33b at a position of second groove 33b of groove 33. In other words, covering member 20 is formed to straddle only a part of groove 33. Therefore, covering base portion 45 is positioned in a side portion of lower spoke section 17 in the embodiment. In addition, covering base portion 45 is set to have a length equal to or shorter than that of second groove 33b. That is, covering base portion 45 is set to have a length to the extent that the covering base portion does not reach first groove 33a. Further, covering base portion 45 becomes a part that electrically connects functional parts 42 to each other which are disposed in divergence covering portions 44. That is, covering base portion 45 is disposed both sheet member 41 and functional part 42, functional part 42 is to straddle groove 33 (second groove 33b).

Outer skin section 21 is a part that is directly gripped by the driver (occupant). Outer skin section 21 is formed of leather such as natural leather or synthetic leather, a synthetic resin, or the like into a sheet shape. Outer skin section 21 covers covering member 20 and is attached to rim section main body portion 35. For example, outer skin section 21 is disposed to continuously cover the front surfaces of rim section main body portion 35 with groove 33 interposed therebetween in a meridian (small diameter) direction which is a sectional-circumferential direction from the front surface side to the back surface side. In the embodiment, terminal portions 21a and 21a of outer skin section 21 are buried to be attached to groove 33, and a so-called grain-patterned design portion 47 is formed in the latitude direction on the driver (occupant) side of rim section 15. Outer skin section 21 may be formed integrally or may be split into a plurality of outer skin piece portions which are connected to each other by sewing or the like.

Cover body 22 is also referred to as a back cover, a lower cover, or a body cover, is formed of a synthetic resin or the like, and covers a lower portion of boss section 16.

As pad body 12 illustrated in FIG. 4, it is possible to use an airbag apparatus or a housing that houses an impact absorber, for example. Pad body 12 may be integrally assemble a horn switch mechanism as a switch apparatus.

In this manner, when steering wheel 10 is manufactured, cored bar 23 that has been formed in advance is set in the forming mold, and then a synthetic resin raw material is agitated and mixed to be injected into a cavity of the forming mold, in which the cavity is formed by combining (mold closing) one half mold and the other mold. As a result, reaction of the synthetic resin raw material is performed with foaming such that polyurethane is obtained and flows toward a flow terminal.

Subsequently, a first intermediate body formed with resin layer 24 covering rim cored bar section 28 in the cavity is released from the forming mold through mold opening of the one half mold and the other half mold, and burr or the like is cut.

Further, covering member 20 that is separately formed adheres on a front surface of resin layer 24 of the first intermediate body. In this case, regarding covering member 20, one divergence covering portion 44 is disposed on the inner side with respect to first groove 33a of groove 33, the other divergence covering portion 44 is disposed on the outer side with respect to first groove 33a of groove 33, and covering base portion 45 is disposed to straddle second groove 33b of groove 33. That is, divergence covering portions 44 and 44 are disposed along first groove 33a of groove 33 with first groove 33a interposed therebetween, that is, not to straddle groove 33, and only covering base portion 45 is disposed to straddle second groove 33b of groove 33. As a result, functional parts 42 of covering member 20 are disposed to alternately intersect the latitude (small diameter) direction of rim section 15, for example.

Then, covering member 20 is further covered with outer skin section 21. In this case, terminal portions 21a and 21a of outer skin section 21 are buried in groove 33 of resin layer 24, which is exposed between divergence covering portions 44 (sheet member 41) of covering member 20 (FIG. 3A). As a result, steering wheel main body 11 having design portion 47 along rim section 15 in the meridian direction is completed. Covering base portion 45 of covering member 20 that straddles second groove 33b is buried in second groove 33b, together with terminal portions 21a of outer skin section 21 (FIG. 3B).

Steering wheel main body 11 electrically connects the functional parts of covering member 20 to the control circuit, and pad body 12 or cover body 22 is attached such that steering wheel 10 is completed (FIG. 4).

As described above, according to the embodiment described above, groove 33 formed along rim section main body portion 35 of steering wheel base section 18 is provided with first line-shaped groove 33a and second line-shaped groove 33b that is less bent than first groove 33a. The Plurality of divergence covering sections 44 of covering member 20 are disposed with first groove 33a interposed therebetween, and covering base portion 45 that connects divergence covering sections 44 is disposed to straddle second groove 33b. In this manner, it is possible to position divergence covering sections 44 at positions on both sides of first groove 33a of groove 33 such that covering member 20 is install on entire rim section main body portion 35, and it is possible to install covering member 20 on rim section main body portion 35 in a wide range. In addition, in a case where groove 33 is formed to curve along bending rim section main body portion 35, rim section main body portion 35 have different dimensions between the inner side (inner circumferential side) and the outer side (outer circumferential side) with groove 33 interposed therebetween in the longitudinal direction (latitude direction of rim section main body portion 35 (rim section 15)) of rim section main body portion 35, and the dimensional difference increases as the bending increases at a position. Therefore, in a case where divergence covering portions 44 with groove 33 interposed therebetween are connected to each other at a part (covering base portion 45), and covering base portion 45 is disposed at a position at which bending relatively increases, a wrinkle is likely to occur due to the dimensional difference. In this respect, in the embodiment, covering base portion 45 is positioned to straddle the position of second groove 33b having relative bending, that is, a bend (curvature) in groove 33. In this manner, it is possible suppress the dimensional difference between both sides (the inner side and the outer side) of groove 33 of rim section main body portion 35, which is bent along an arc, for example, at the position of covering base portion 45 straddling groove 33 such that a defect such as a wrinkle in the external appearance is unlikely to occur in covering member 20, and it is possible to perform installation with a good external appearance. Moreover, in the embodiment, second groove 33b has a straight line shape, for example, and thereby it is possible to suppress the dimensional difference at the position, at which second groove 33b interposed, to the smallest extent and to have covering member 20 in which a defect such as a wrinkle in the external appearance is unlikely to occur.

In particular, covering member 20 is the heater unit provided with sheet-shaped sheet member 41 and a heating circuit as functional part 42 that is held by sheet member 41 and generates heat when energized. In this manner, it is possible to install covering member 20 on rim section main body portion 35 in a wide range and warm rim section 15 in a wide range, and it is possible to obtain warmth even in a case where the driver grips any position of rim section 15.

In addition, covering member 20 straddles only the position of second groove 33b having the relatively small bending of groove 33, and thus it is possible to smoothly perform work without an influence on workability.

In the embodiment described above, covering member 20 may be a sensor unit that has, as functional part 42, a sensor circuit (a pressure sensor, an electric capacity sensor, or the like) that is to check that the occupant grips rim section 15. As described above, covering member 20 is the sensor unit provided with sheet-shaped sheet member 41 and the sensor circuit as functional part 42 that is held by sheet member 41 and detects a contact. In this manner, it is possible to install covering member 20 on rim section main body portion 35 in a wide range and detect the contact with rim section 15 in a wide range, and it is possible to detect a grip on rim section 15 even in a case where the driver grips any position of rim section 15.

In addition, covering member 20 can use, as functional part 42, a circuit that functions as the heating circuit and the sensor circuit, that is, a circuit that uses a heater line itself as a sensor. In this case, it is possible to simply configure steering wheel 10 that is capable of detecting the contact while warming rim section 15 in a wide range.

Further, covering member 20 can have a configuration in which the heating circuit and the sensor circuit are held by the same sheet member 41.

In addition, covering member 20 can have a sheet-shaped touch-feeling improving member that improves a touch feeling on rim section 15, for example.

Further, covering member may also be sheet-shaped outer skin section 21. That is, even when outer skin section 21 as covering member is directly wrapped on resin layer 24, instead of covering member 20 of the embodiment described above, outer skin section 21 is configured to have the plurality of divergence covering portions that are positioned along first groove 33a of groove 33 with first groove 33a interposed therebetween and covering base portion 45 straddles second groove 33b at the position of second groove 33b of groove 33 and connects the plurality of divergence covering portions to each other. In this manner, it is possible to suppress a wrinkle or the like and install outer skin section 21 on rim section main body portion 35 in a wide range and with a good external appearance.

In addition, the position at which covering base portion 45 straddles second groove 33b is set to a position of steering wheel 10 in the six o'clock direction of the analog clock, that is, in a side portion of lower spoke section 17; however, it is possible to set the position at another position such as a lower portion or an upper portion of right and left spoke section 17, for example.

Further, steering wheel 10 is not limited to the configuration in which three spoke sections 17 are provided, and can have a configuration in which two, four, or more spoke sections 17 are provided.

In this manner, steering wheel 10 can be used as the steering wheel for steering not only the vehicle such as the automobile but also any vehicle.

INDUSTRIAL APPLICABILITY

The present invention can be preferably used as a steering wheel of an automobile such as an electric vehicle, for example.

The invention claimed is:

1. A steering wheel having a grip section that is gripped and operated by a driver, the steering wheel comprising:
   a steering wheel base section provided with a grip section main body portion, a bent part of which forms a portion of the grip section, and a groove formed along the grip section main body portion; and
   a covering member that is wrapped around the grip section main body portion of the steering wheel base section,
   wherein the groove is provided with:
   a first groove, and
   a second groove that is less bent than the first groove, and
   wherein the covering member is provided with:
   a plurality of divergence covering sections that are disposed along the first groove and are positioned with the first groove interposed therebetween, and
   a covering base portion that straddles the second groove at a position of the second groove and connects the plurality of divergence covering sections to each other.

2. The steering wheel according to claim 1, wherein the covering member is a heater unit provided with a covering member main body and a heating circuit that is held by the covering member main body and generates heat when energized.

3. The steering wheel according to claim 2, wherein the heating circuit comprises a heater line.

4. The steering wheel according to claim 1, wherein the covering member is a sensor unit provided with a covering member main body and a sensor circuit that is held by the covering member main body and detects a contact.

5. The steering wheel according to claim 1, wherein the covering member is an outer skin section.

* * * * *